United States Patent [19]

Pasternak et al.

[11] Patent Number: 4,897,091

[45] Date of Patent: Jan. 30, 1990

[54] MEMBRANE PROCESS FOR SEPARATING GASES FROM GAS-LIQUID CHARGE STREAMS

[75] Inventors: Mordechai Pasternak, Spring Valley, N.Y.; Richard F. Beaupre, Greenwich, Conn.

[73] Assignee: Texaco Inc., White Plains, N.Y.

[21] Appl. No.: 176,895

[22] Filed: Apr. 4, 1988

[51] Int. Cl.$^4$ .............................................. B01D 13/00
[52] U.S. Cl. .......................................... 55/16; 55/159; 210/500.37; 210/640
[58] Field of Search ................... 210/500.37, 490, 640; 55/16, 158, 159

[56] References Cited

U.S. PATENT DOCUMENTS

| 4,444,571 | 4/1984 | Matson | 55/54 X |
| 4,461,165 | 7/1984 | Kesson | 55/159 X |
| 4,493,714 | 1/1985 | Ueda et al. | 55/16 |

*Primary Examiner*—Frank Spear
*Attorney, Agent, or Firm*—Robert A. Kulason; James J. O'Loughlin; Carl G. Seutter

[57] ABSTRACT

Gases such as carbon dioxide may be separated from rich liquor (such as methanol containing carbon dioxide) by passage of gas through a membrane which is the reaction product of (i) a polyamine and (ii) a polyisocyanate or a poly (carbonyl chloride).

17 Claims, No Drawings

MEMBRANE PROCESS FOR SEPARATING GASES FROM GAS-LIQUID CHARGE STREAMS

FIELD OF THE INVENTION

This invention relates to the separation of gases. more particularly it relates to a process for recovering gases from liquids in which they are found.

BACKGROUND OF THE INVENTION

As is well known to those skilled in the art, gases such as acid gases (typified by hydrogen sulfide, carbonyl sulfide, carbon dioxide etc) have been removed from sour gas streams in which they occur by a wide variety of absorption process. In these processes, the sour gas stream is contacted with a lean liquor, in which the acid gas is soluble, in an absorber; and the acid gas is separated from the liquor in a desorber or stripper. The regenerated solvent is then recycled to the absorber.

The solvents which may be employed include chemical solvents such as diethanolamine, N-methyldiethanolamine, or tropine or physical solvents such as methanol; propylene carbonate; N-methyl-2 pyrrolidone; tetrahydrothiophene-1, 1-dioxide; polyethylene glycol dimethyl ether; etc.

One commonly used system is the Selexol process in which polyethylene glycol dimethyl ether is used to absorb hydrogen sulfide, carbon dioxide, carbonyl sulfide, etc. from gas streams. Another common system is the Rectisol process which may be used for example to recover carbon dioxide by absorption in methanol.

The rich pressurized liquid from the absorber, typically containing say methanol and carbon dioxide, is commonly depressurized in a flash drum to separate gas; the flashed liquid may then be heated and passed to a stripper wherein additional gas is separated. The lean absorbent is then recycled to the absorber.

It is well known to those skilled in the art that the separation of gas from the rich liquid is costly both in terms of capital expense (requiring flash drums, distillation towers, and heat exchangers) and operating expense (due to cost of pumping, heating, condensing, etc.)

It is an object of this invention to provide a process for separating gases. Other objects will be apparent to those skilled in the art.

STATEMENT OF THE INVENTION

In accordance with certain of its aspects, this invention is directed to a process for separating a gas from a gas-liquid charge which comprises
  maintaining, as a non-porous membrane separating layer, a membrane of the polymeric reaction product of (i) a polyamine and (ii) a polyisocyanate or a poly (carbonyl chloride);
  passing into contact with the charge side of said membrane a gas-liquid charge;
  maintaining a pressure drop across said membrane whereby at least a portion of said gas of said gas-liquid charge passes through said membrane as permeate and said gas-liquid charge is converted to a lean liquid retentate containing less gas than is present in said gas-liquid charge;
  recovering from the low pressure side of said non-porous membrane separating layer said permeate gas; and
  recovering from the high pressure side of said non-porous membrane separating layer said lean liquid retentate containing less gas than is present in said gas-liquid charge.

DESCRIPTION OF THE INVENTION

The charge stream admitted to the process of this invention may be a rich liquor—a liquid solvent which contains dissolved therein a gas. Although the solvent may be any liquid in which a selected gas is soluble, clearly the liquids which are particularly of interest include those which are used in commercial absorption systems. Among these may be noted (i) alcohols such as methanol, ethanol, isopropanol, n-propanol, butanols, pentanols, etc; (ii) carbonates such as ethylene carbonate, propylene carbonate, etc; (iii) nitrogen heterocyles such as N-methyl-2 pyrrolidone; (iv) glycol types such as polyethyene glycol dimethyl ether, etc; (v) amine types such as monoethanolamine, diethanolamine, N-methyl diethanolamine, etc; etc.

The gases which may be absorbed may include acid gas such as hydrogen sulfide, carbon dioxide, carbonyl sulfide, sulfur dioxide, sulfur trioxide, hydrogen chloride, etc.

In the typical system with which the process of this invention finds use, the solvent may be methanol and the gas absorbed therein may contain carbon dioxide. An illustrative sour gas feed may contain (vol %) about 19.5 v % $CO_2$, 42.5 v % CO, 34 v % hydrogen, 1 v % $H_2S$, and small quantities of other gases including COS, $N_2$, Ar, $CH_4$, $NH_3$, and $H_2O$.

A typical rich liquid (which has been used to absorb carbon dioxide from this sour gas by the Rectisol process) may contain methanol and carbon dioxide. Typically the gas in the rich liquid may contain a substantial quantity say 73 v % carbon dioxide—as might be the case when the absorbent is used to recover $CO_2$ from the gas generated in the Texaco Coal Gasification Process. In this latter instance, the rich liquid may also contain CO and $H_2S$ in amount of about 15% and 8% respectively and lesser quantities of other gases.

THE MEMBRANE

The composite membrane structure which may be used in practice of this invention may include a multi-layer assembly which in the preferred embodiment preferably includes a porous carrier layer which provides mechanical strength and support to the assembly.

THE CARRIER LAYER

The carrier layer, when used, is characterized by its high degree of porosity and mechanical strength. It may be fibrous or non-fibrous, woven or non-woven. In the preferred embodiment, the carrier layer may be a porous, flexible, non-woven fibrous polyester. A preferred non-woven polyester carrier layer may be formulated of non-woven, bonded strands and characterized by a fabric weight of 80±8 grams per square yard, a thickness of 4.2±0.5 mils, a tensile strength (in the machine direction) of 31 psi and (in cross direction) of 10 psi, and a Frazier air permeability of 6 cu.ft./min/sq. ft. @ 0.5 inches of water.

THE POROUS SUPPORT LAYER

The porous support layer which may be used in practice of this invention is preferably formed of a sheet of polysulfone polymer. Typically the polysulfone may be of thickness of 40–80 microns, say 50 microns and of molecular weight $\overline{M}_n$ of 5,000–100,000, preferably 20,000-60,000, say 40,000. The polysulfone is preferably characterized by a pore size of less than about 500 A and typically about 200 A. This corresponds to a molecular weight cut-off of less than about 25,000, typically about 20,000.

The sulfone polymers which may be employed may include those from cumene, containing isopropylidene groups in the backbone; e.g.

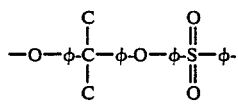

These isopropylidene sulfones containing repeating units including ether-aromatic-isopropylidene-aromatic-ether aromatic-sulfone-aromatic groups may typically have a molecular weight $\overline{M}_n$ of 15,000–30,000, a water absorption (at 20° C.) of about 0. 85 w %, a glass transition temperature of 449° K., a density of 1.25 mg/m$^3$, a tensile strength (at 20° C.) at yield of 10,000 psi, and a coefficient of linear thermal expansion of $2.6 \times 10^{-5}$ mm/mm/°C.

It is found, however, that the preferred sulfone polymers which may be employed in practice of the process of this invention, may include those which are free of isopropylidine moieties in the backbone chain and wherein the phenylene groups in the backbone are bonded only to ether oxygen atoms and to sulfur atoms. One preferred polymer, which may typically, be prepared from

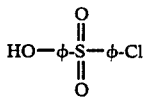

may be characterized by a backbone containing the following repeating groups:

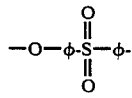

A preferred sulfone polymer may be a polyether sulfone which is free of isopropylidene moieties in the backbone chain and wherein the phenylene groups in the backbone are bonded only to ether-oxygen atoms and to sulfur atoms. This polymer may be characterized by molecular weight $\overline{M}_n$ of 25,000, water absorption @ 20° C. of 2.1 w %, glass transition temperature of 487° K., tensile strength at yield of 12,2000 psig at 20° C.; and coefficient of linear thermal expansion of $5.5 \times 10^{-5}$ mm/mm/°C. This polymer has a molecular weight cut off of about 20,000 and has a pore size of about 200 A.

When the charge contains a component which dissolves the polysulfone (as is the case, e.g. with ketones or esters), the preferred support layer may be a polyacrylonitrile.

THE SEPARATING LAYER

The non-porous barrier or separating layer which permits attainment of separation in accordance with practice of the process of this invention may include a film or membrane of the polymeric reaction product of (i) a polyamine and (ii) a polyisocyanate or a poly (caronyl chloride):

$$R''(NHR)_c \text{ and } R''[(NCO)_a (COCl)_{1-a}]_b$$

wherein R is a monovalent hydrocarbon moiety;
R″ is a polyvalent hydrocarbon moiety;
a is 0 or 1; and
b and c are integers greater than 1.

The first reactant $R''(NHR)_c$ is a polyamine (i.e. a preferably monomeric compound containing a plurality of amine groups). In this compound, may be an integer greater than one. When c is two, the first reactant is a diamine. When c is three, as in the preferred embodiment, the first reactant is a triamine.

R″ maybe a polyvalent hydrocarbon moiety such as 1,3,5-triphenyl or 1,2,3,5 tetraphenyl. In the preferred embodiment, R″ maybe a divalent moiety.

In the above formula, R″ may preferably be a hydrocarbon group selected from the group consisting of alkylene, aralkylene, cycloalkylene, arylene, and alkarylene, including such radicals when inertly substituted. When R″ is alkylene, it may typically be methylene, ethylene, n-propylene, iso-propylene, n-butylene, i-butylene, sec-butylene, amylene, octylene, decylene, octadecylene, etc. When R″ is aralkylene, it may typically be benzylene, beta-phenylethylene, etc. When R″ is cycloalkylene, it may typically be cyclohexylene, cycloheptylene, cyclooctylene, 2-methylcycloheptylene, 3-butylcyclohexylene, 3-methylcyclohexylene, etc. When R″ is arylene, it may typically be phenylene, naphthylene, etc. When R″ is alkarylene, it may typically be tolylene, xylylene, etc. R″ may be inertly substituted i.e. it may bear a non-reactive substituent such as alkyl, aryl, cycloalkyl, ether, etc. Typically inertly substituted R″ groups may include 3-methoxypropylene, 2-ethoxyethylene, carboethoxymethylene, 4-methylcyclohexylene, p-methylphenylene, p-methylbenzylene, 3-ethyl-5-methylphenylene, etc. The preferred R″ groups may be phenyl or lower alkylene, i.e. $C_1-C_{10}$ alkylene, groups including e.g. methylene, ethylene, n-propylene, i-propylene, butylene, amylene, hexylene, octylene, decylene, etc. R″ may preferably be phenylene or ethylene —CH$_2$H$_2$—.

In the above compound, R may be hydrogen or a hydrocarbon selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-buty, amyl, octyl, decyl, octadecyl, etc. When R is aralkyl, it may typically be benzyl, beta-phenylethyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 3-methoxypropyl, 2-ethoxyethyl, carboethoxymethyl, 4-methylcyclohexyl, p-methylphenyl, p-methylbenzyl, 3-ethyl-5-methylphenyl,etc. The preferred R groups may be hydrogen or lower alkyl, i.e. $C_1-C_{10}$ alkyl, groups including e.g. methyl, ethyl, n-propyl, i-propyl, butyls, amyls, hexyls, octyls, decyls, etc. R may preferably be hydrogen.

In one of its preferred embodiments, the R" group of the first reactant may contain a polyoxyalkylene moiety or a polyalkylene imine moiety. Illustrative of the first reactants may be those set forth in the following table, the first listed being preferred:

TABLE

A.  $CH_2(OCH_2-CH)_xNH_2$
                   |
                   $CH_3$ $CH_3-CH_2-C-CH_2(OCH_2-CH)_yNH_2$
                                |
                                $CH_3$ $CH_2(OCH_2-CH)_zNH_2$
            |
            $CH_3$ wherein $x+y+z$ is typically 1–20, say 5.3
B. $H_2NCH_2CH_2NH_2$
C. $(C_2H_5)HNCH_2CH_2NH(C_2H_5)$ The second reactant $R''[(NCO)_a (COCl)_{1-a}]_b$, wherein a is 0 or 1 and b is an integer greater than 1, may be a polyisocyanate when is 1. When a is 0, the second reactant may be a poly (carbonyl chloride). Preferably a is 1 and b is 2 i.e. the preferred second reactant is a diisocyanate.

R" in the second reactant may be selected from the same group as that from which R" in the first reactant is selected. In the preferred embodiment, R" in the first reactant may be different from the R" in the second reactant; and preferably at least one of the R" groups is aromatic.

The preferred polyisocyanates (i.e. monomeric compounds bearing a plurality of —NCO isocyanate groups) may include those which contain an aromatic nucleus, typically a toluene diisocyanate or a phenylene diisocyanate.

The preferred poly (carbonyl chlorides) (i.e. monomeric compounds bearing a plurality of —COCl carbonyl chloride groups) may include those which contain an aromatic nucleus.

Illustrative second reactants may include the following, the first listed being preferred:

TABLE

| meta-phenylene diisocyanate |
| 2,4-toluene diisocyanate |
| 3,5-toluene diisocyanate |
| para-phenylene diisocyanate |
| hexamethylene diisocyanate |
| isophthyaloyl dichloride |
| terephthaloyl dichloride |
| 1,3,5 benzene tri(carbonylchloride) |
| suberoyl dichloride |

In practice of the process of this invention, the separating membrane layer may be formed by interfacial polymerization. This may be effected as by casting the membrane on a support layer, such as the preferred porous polysulfone support. In this aspect of the invention, one of the reactants, preferably the first reactant (e.g Jeffamine T-403 brand of oxypropylene triamine in 1 w % aqueous solution) is poured onto a support membrane and allowed to migrate into the pores of the support membrane over 1–8 minutes, say 2 minutes.

The second reactant (e.g a toluene diisocyanate such as 2,4-toluene diisocyanate) preferably in 1% solution in a hydrocarbon such as hexane is then poured in equivalent amount carefully onto the surface of the support membrane into which the first reactant has been absorbed. The first and second reactants are allowed to interfacially polymerize at 20° C.–40° C. for say 25° C. for 10–60 seconds, say 15 seconds. The excess of unreacted second reactant may then be carefully poured off to terminate the interfacial reaction process. The so-formed assembly may be heat cured at 120°–140° C., say 125° C. for 10–30 minutes, say 15 minutes. During this curing, thermal crosslinking may complete the fabrication of the barrier layer.

Typically the barrier layer may be of thickness of 0.1–1, say 0.5 microns. The molecular weight $\overline{M}_n$ of the polymer will vary depending on the composition thereof.

The membranes of this invention may be utilized in various configurations. It is, for example, possible to utilize the composite in a plate-and-frame configuration in which the separating layer may be mounted on the porous support layer with the carrier layer.

It is possible to utilize a spiral wound module (in the case of a supported membrane) which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic foraminous net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit input prevents fluid from bypassing the operative membrane system and insures that fluid enters the membrane system principally at one end. The permeate passes from the feed channel, into contact with the separating layer and thence therethrouqh, into the permeate channel and thence therealong to and through the perforations in the conduit through which it is withdrawn as net permeate.

In the case of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn from the system. In this embodiment, it will be apparent that the system may not include a carrier layer.

In another embodiment, it is possible to utilize the system of this invention as a tubular or hollow fibre. In this embodiment, the porous support (e.g. polysulfone) layer may be extruded or spun as a fine tube with a wall of thickness of typically 0.001–0.1 mm. The extruded tubes are passed through a bath of first reactant and second reactant which are interfacially polymerized and cured in situ on the tubes. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid may be admitted to the tube side and passes through the inside of the tubes and exits as retentate. During passage through the tubes, permeate passes through the non-porous separating layer and permeate is collected in the shell side.

SEPARATION

It is a feature of the non-porous separating layer of this invention that it is found to be particularly effective when used in a separation process. During separation, a charge liquid containing a more permeable gas and a less permeable liquid component is maintained in contact with a non-porous separating layer; and a pressure drop is maintained across that layer. The gas in the charge liquid diffuses through the membrane. The gas permeate which passes through the membrane and exits as gas may be withdrawn as gas. The discharge side of the membrane is maintained at a pressure which is less than the vapor pressure of the permeate gas. Preferably, the permeate side of the membrane is maintained at a pressure of typically 10–20, say 14.7 psig. The charge side of the membrane may typically be at 5–80 psig, say 40 psig. Operation may typically be carried out at minus 10° C.–30° C., say 25° C.

The permeate which passes through the membrane typically includes e.g. gas and a small proportion of the charge liquid. Typically, the permeate contains 90–99 w %, say up to 99 w % gas. Permeate is recovered in gas phase.

Separation may typically be carried out at a flux of 0.01–1.5, say about 1.0 kilograms per square meter per hour (kmh). Typically, the units may have a rejection (measured in terms of w % of e.g. methanol in the retentate during operation at 70° C. of a solution of carbon dioxide through a standard separating layer 3 microns thickness) of 90–99.9 w % methanol.

It will be apparent that variations in the ability to effect separation of gas from rich liquor may be observed depending on the particular membrane employed. For example use of a polyisocyanate reactant will generally yield membranes of higher selectivity albeit of lower flux than use of carbonyl chloride-derived membranes.

It will be observed that membranes formed from systems containing an aromatic backbone in at least one of the first or second reactants have higher selectivity than those which are free of aromatic components in the backbone.

It will also be observed that high selectivity is attained when one of the reactants is a meta-derivative (as in meta-phenylene diisocyanate) than when the corresponding ortho- or para- derivative is used.

High flux may be achieved by use of reactants characterized by the presence of carbonyl chloride functionality preferably associated with an aliphatic backbone containing at least about six carbon atoms (as in suberoyl dichloride $ClCO(CH_2)_6COCl$.

DESCRIPTION OF PREFERRED EMBODIMENTS

Practice of the process of this invention will be apparent to those skilled in the art from the following wherein, as elsewhere in this specification, all parts are parts by weight unless otherwise specified. In considering the examples, it should be noted that since these membranes are "hand made", variations (e.g. in membrane thickness) occur. Data reported for each example are actually the average of at least three runs.

EXAMPLE I

In this example which represents the best mode presently known of practicing this invention, the microporous support layer is a layer, 50 microns thick, of polysulfone membrane of molecular weight $\overline{M}_n$ of about 25,000. It has a pore size of about 200 A which corresponds to a molecular weight cut-off of less than 25,000, typically about 20,000.

The sulfone polymer is isopropylidene-free and is characterized by a backbone chain containing phenylene groups which are bonded only to ether oxygen atoms or to sulfur atoms

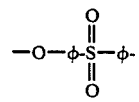

This polymer has a molecular weight $\overline{M}_n$ of about 25,000, water absorption at 20° C. of 2.1 w %, glass transition temperature of 487° K., tensile strength at yield of 2,200 psig at 20° C.; and coefficient of linear thermal expansion of $5.5 \times 10^{-5}$ mm/mm/°C.

The separating layer is formed in situ on the polysulfone support layer which is mounted within a frame. The layer is formed by interfacial polymerization between the Texaco Jeffamine T-403 brand of oxypropylene polyamine and toluene diisocyanate (TDI). This commercially available polyamine is made by catalytic amination (with ammonia in the presence of hydrogen) of the reaction product of trimethylol propane and propylene oxide:

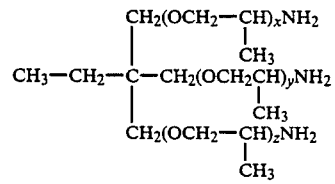

wherein $x+y+z=5.3$

A w % aqueous solution of the polyamine is deposited on the surface of the support layer at 25° C. and is allowed to migrate into the pores of the support. After 2 minutes, excess solution is poured off and the assembly is held in vertical position to drain.

There is then added a 1 w % solution of 2,4-toluene diisocyanate in hexane, this being added at the bottom of the frame (while the latter is held at a 45° angle to the horizontal). The frame is then carefully leveled horizontally to permit the organic solution to coat the partially absorbed aqueous solution. During coating and contact, rapid interfacial polymerization occurs over about 15 seconds. After that time, the remaining liquid is then carefully poured off to assure termination of the interfacial polymerization reaction.

The so-formed membrane is heat cured at 125° C. for 15 minutes. During this annealing period, thermal crosslinking completes the fabrication of the barrier layer.

This system is used to permit ready separation of carbon dioxide from a rich solution thereof in methanol.

In this embodiment, the membrane assembly is first allowed to equilibrate with the charge liquid at operating conditions, as this reduces the time to reach steady state operation to less than about one hour.

The charge rich liquid at 80 psig and and 25° C. is passed into contact with the membrane.

The flux of $CO_2$ which passes through the membrane is found to be $10.5 \times 10^{-3}$ cc/sec/sq. cm and the rejection (measured as the quantity of methanol retained times 100 divided by the quantity of methanol in the feed) is greater than 99%.

It is thus clear that the process of this invention permits conversion of rich $CO_2$-containing liquor to lean liquor containing a desirably decreased content of $CO_2$ and that very little (less than 1 w % of the methanol in the rich liquor passes through the membrane assembly. High flux is attained during the separation of carbon dioxide.

EXAMPLE II-IV

In this series of Examples, the procedure of Example I is followed, except that the pressure of operation is varied.

TABLE

| Example | Cell Pressure psig | Flux × $10^3$ cc/sec · cm$^2$ |
|---|---|---|
| I | 80 | 10.5 |
| II | 60 | 2.7 |
| III | 40 | 0.7 |
| IV | 20 | 0.4 |

From the above table it is apparent that higher flux is attained at higher pressure.

Examples V-VIII

In this series of examples, the procedure of Example I is followed except that the charge rich liquid is a solution which, at 5-40 psig and 25° C., contains hydrogen sulfide.

TABLE

| Example | Cell Pressure psig | Flux × $10^3$ cc/sec · cm$^2$ |
|---|---|---|
| V | 40 | 6.5 |
| VI | 20 | 1.0 |
| VII | 10 | 0.7 |
| VIII | 5 | 0.4 |

From the above table, it is apparent that higher flux is attained at higher pressure.

EXAMPLES IX-XVI

In this series of runs, the procedure of Examples V-VIII is duplicated except that the pressure and temperature in the membrane assembly or cell are varied

TABLE

| Example | Pressure psig | Temp °F. | Flux × $10^3$ cc/sec · cm$^2$ |
|---|---|---|---|
| IX | 20 | 0 | 1.0 |
| X | 20 | 76 | 0.9 |
| XI | 20 | 92 | 0.8 |
| XII | 10 | −14 | 0.7 |
| XIII | 10 | 13 | 0.7 |
| XIV | 10 | 83 | 0.4 |
| XV | 5 | −5 | 0.4 |
| XVI | 5 | 14 | 0.3 |

From the above table, it is apparent that higher flux is attained at higher pressure and at lower temperature.

Results comparable to those attained with Example I may be achieved if the gas and liquid are as follows:

TABLE

| Example | Gas | Liquid |
|---|---|---|
| XVII | carbon dioxide | diethanolamine |
| XVIII | carbon dioxide | propylene carbonate |
| XIX | carbon dioxide | polyethyleneglycol dimethylether |
| XX | hydrogen sulfide | ethanolamine |
| XXI | hydrogen sulfide | N—methyl pyrrolidone |
| XXII | hydrogen sulfide | polyethylene glycol dimethylethyl ether |
| XXIII | carbon dioxide | tetraethylene glycol dimethyl ether |

Results comparable to those of Example II may be attained if the separating membrane is formed from the following:

TABLE

| Example | Second Reactant | First Reactant |
|---|---|---|
| XXIV | m-phenylene diisocyanate | ethylene diamine |
| XXV | p-phenylene diisocyanate | polyethyleneimine |
| XXVI | suberoyl dichloride | 1,3-phenylene diamine |
| XXVII | 1,3,5 benzene tricarbonyl chloride | ethylene diamine |
| XXVIII | terephthaloyl dichloride | ethylene diamine |
| XXIX | isophthaloyl dichloride | polyethylenimine |

Although this invention has been illustrated reference to specific embodiments, it will be apparent to those skilled in the art that various charges and modifications may be made which clearly fall within the scope of the invention.

We claim:

1. The process for separating a gas from a gas-liquid charge which comprises maintaining, as a non-porous membrane separating layer, a membrane of the polymeric reaction product of (i) a poly oxyalkylene polyamine and (ii) a dissocyanate;

passing into contact with the charge side of said membrane a gas-liquid charge;

maintaining a pressure drop access said membrane whereby at least a portion of said gas of said gas-liquid charge passes through said membrane as permeate and said gas-liquid charge is converted to a lean liquid retentate containing less gas than is present in said gas-liquid charge;

recovering from the low pressure side of said non-porous membrane separating layer said permeate gas; and recovering from the high pressure side of said non-porous membrane separating layer said lean liquid retentate containing less gas than is present in said gas-liquid charge.

2. The process for separating a gas from a gas-liquid charge as claimed in claim 1 wherein said gas-liquid charge contains an acid gas.

3. The process for separating a gas from a gas-liquid charge as claimed in claim 1 wherein said gas-liquid charge contains carbon dioxide.

4. The process for separating a gas from a gas-liquid charge as claim 1 wherein said gas-liquid charge contains an alcohol.

5. The process for separating a gas from a gas-liquid charge as claimed in claim 1 wherein said gas liquid charge contains methanol.

6. The process for separating a gas from a gas-liquid charge as claimed in claim 1 wherein said gas liquid charge contains carbon dioxide and methanol.

7. The process for separating a gas from a gas-liquid charge as claimed in claim 1 wherein said polyamine is a diamine.

8. The process for separating a gas from a gas-liquid charge as claimed in claim 1 wherein said polyamine is a polyoxyalkylene triamine.

9. The process for separating a gas from a gas-liquid charge as claimed in claim 1 wherein said polyamine is an aromatic diamine.

10. The process for separating a gas from a gas-liquid charge as claimed in claim 1 wherein said polyisocyanate is an aromatic diisocyanate.

11. The process for separating a gas from a gas-liquid charge as claimed in claim 1 wherein said polyisocyanate is a m-phenylene diisocyanate.

12. A membrane comprising the polymeric reaction product of (i) a polyoxyalkylene polyamine and (ii) a diisocyanate.

13. A membrane as claimed in claim 12 wherein said polyamine is a triamine.

14. A membrane as claimed in claim 12 wherein said polyamine is:

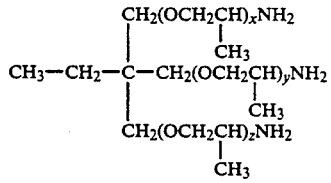

wherein x+y+z is 1-20.

15. A membrane as claimed in claim 12 wherein said diisocyanate contains an aromatic nucleus.

16. A membrane as claimed in claim 12 wherein said diisocyanate is a toluene diisocyanate.

17. A membrane comprising the polymeric reaction product of:

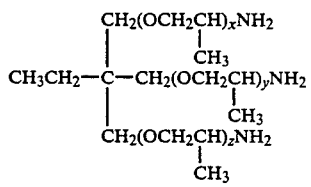

wherein x+y+z is 1-20 and toluene diisocyanate.

* * * * *

UNITED STATES PATENT AND TRADEMARK OFFICE
CERTIFICATE OF CORRECTION

PATENT NO. : 4,897,091

DATED : January 30, 1990

INVENTOR(S) : Mordechai PASTERNAK, Richard Frank BEAUPRE

It is certified that error appears in the above-identified patent and that said Letters Patent is hereby corrected as shown below:

Col 1, line 7, cancel "more", insert -- More --; line 15, cancel "process", insert -- processes --.

Col 8, line 59, correct the text to read -- A 1w% ... --.

Col 10, line 43, after "illustrated" insert -- by --.

Signed and Sealed this

Twelfth Day of March, 1991

Attest:

HARRY F. MANBECK, JR.

*Attesting Officer*     Commissioner of Patents and Trademarks